Aug. 25, 1959  A. S. PAGE  2,901,284
ADJUSTABLE LEAF SPRING ASSEMBLY FOR VEHICLE BODY MOUNTING
Filed Feb. 24, 1958
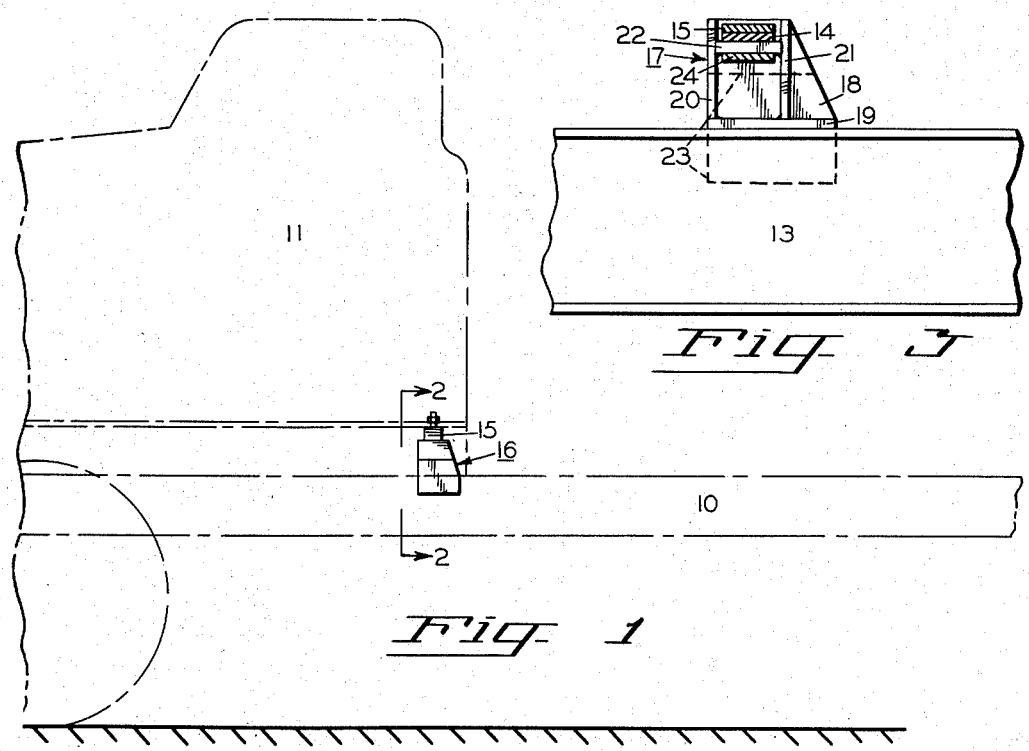
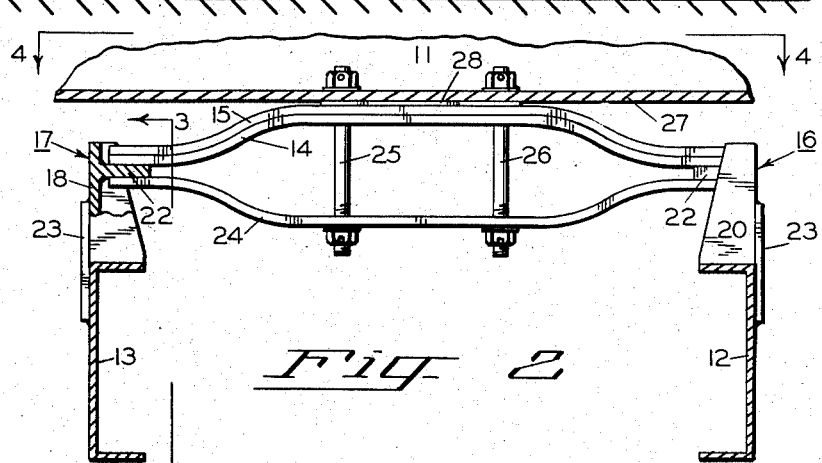
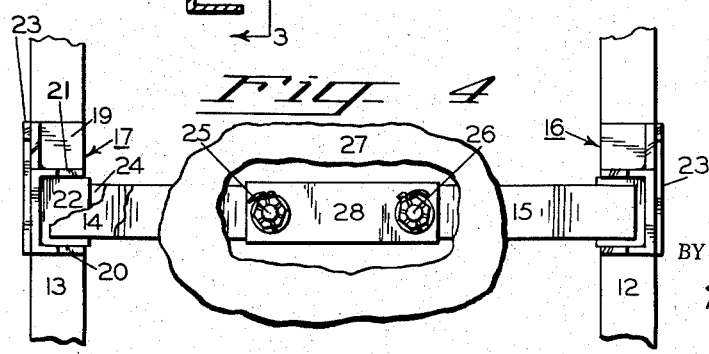
INVENTOR.
ANCEL S. PAGE
BY
ATTORNEY United States Patent Office 2,901,284
Patented Aug. 25, 1959

2,901,284

ADJUSTABLE LEAF SPRING ASSEMBLY FOR VEHICLE BODY MOUNTING

Ancel S. Page, Portland, Oreg.

Application February 24, 1958, Serial No. 716,932

2 Claims. (Cl. 296—35)

This invention relates to the mounting of a body on a chassis frame of a vehicle wherein spring means are employed for cushioning and partially absorbing the shocks transmitted from the chassis to such body, and the invention relates in particular to a mounting for the rear portion of a cab body on a truck or similar motor vehicle.

While spring mountings of various types are employed for the mounting of vehicle bodies and cabs, a common fault or limitation of these is that they cannot readily be adjusted for different loads or different road conditions. Thus, for example, a spring assembly adapted for cushioning the shocks transmitted under a heavy load may have insufficient flexibility when employed with a much lighter load. Such difficulties have become a familiar problem, particularly in the case of trucks employed for long hauls, with respect to the mounting of the rear of the cab on the truck chassis frame, and even though the cab may be spaced forwardly of and secured to the frame independently of the load-carrying body of the truck, and though the load in the cab itself may be substantially the same at all times, nevertheless the various shocks transmitted through the frame under different load conditions, including the bending vibrations of the frame under certain vehicle speeds, will, as a rule, be most pronounced in the vicinity of the location of the rear of the cab on the truck frame.

The general object of the present invention is to provide an improved spring mounting assembly the flexibility and resiliency of which can be adjusted to suit different loads or different conditions of use.

A related object of the invention is to provide a spring assembly composed of a plurality of leaf springs in which the tension of the leaf springs can be readily adjusted.

A further specific object is to provide an improved and more satisfactory spring mounting adapted particularly for supporting the rear portion of a cab on the frame of a truck or similar vehicle.

An additional object of the invention is to provide an improved arrangement of leaf springs in a spring assembly in such manner that one of the leaf springs will exert a restraining influence on the reactions of the rest of the assembly.

The manner in which these objects and other advantages are attained with the leaf spring assembly of the present invention will be readily apparent from the following brief description in which reference is to be made to the accompanying drawings.

In the drawings:

Fig. 1 is a side elevation of the spring assembly showing the same positioned for supporting the rear portion of a cab on the frame of a truck; the rear portion of the cab and corresponding portion of the truck frame being indicated by broken lines;

Fig. 2 is an enlarged sectional view taken transversely through the vehicle frame on the line indicated at 2—2 in Fig. 1, showing the entire spring assembly in elevation, with portions of the spring end housing support broken away for clarity;

Fig. 3 is a section on line 3—3 of Fig. 2; and

Fig. 4 is a plan view of Fig. 2 taken on line 4—4 of Fig. 2.

In Fig. 1 the chassis frame of the vehicle is indicated at 10 and the cab at 11. The chassis frame includes a pair of longitudinally-extending main side members 12 and 13 (Fig. 2) which are shown as having the conventional U-shaped or channel form.

The spring assembly, which serves as the mounting support for the rear portion of the cab, extends transversely across the chassis frame above the main members 12 and 13. The assembly includes a pair of upwardly-bowed leaf springs 14 and 15 (Fig. 2) having their ends supported in a pair of housings 16 and 17. These housings 16 and 17 are rigidly mounted on top of the main frame members 12 and 13 respectively directly opposite each other and are identical. It will suffice therefore to describe one of the housings 17 with reference to Figs. 2, 3 and 4.

The housing 17 has an outer vertical wall 18 which extends in the same vertical plane as the side or central section of the chassis frame member 13. The housing 17 also has a bottom wall 19 which rests on and is secured to the top flange of the chassis frame member 13, and has a pair of vertical ribs 20 and 21 (Fig. 3) arranged at right angles to the outer wall 18 which extend up to the top of the outer wall 18; and finally the housing has a horizontal spring-supporting and bearing plate 22 secured to the ribs 20 and 21 and to the outer wall 18.

Preferably, but not necessarily, the outer wall 18 of the housing is trapezoidal in shape, instead of being rectangular, the greater width at the bottom being preferred for giving increased strength to the housing and also making possible a longer bottom wall 19 which enables the housing to be more rigidly secured to the chassis frame member. An exterior plate 23 extends over the lower portion of the outer wall 18 and over a portion of the outer face of the chassis frame member so as to provide a further means of firmly securing the housing to the chassis frame member. The housing may be secured to the chassis frame member either by suitable bolts or by welding. In the example illustrated it is assumed that the housing is secured by welding and the bottom wall 19 accordingly is welded to the top flange of the chassis frame member while the exterior plate 23 is welded to the outer wall 18 of the housing and to the outer face of the chassis frame member.

As previously indicated, the two adjacent, upwardly-bowed leaf springs 14 and 15 rest at their ends, one above the other, on the bearing plate 22 in each of the two housings 16 and 17. The ends of these leaf springs terminate a slight distance inwardly from the outer wall 18 in each housing so as to allow for longitudinal extension of the springs under deflection. The width of the two springs 14 and 15 is only slightly less than the width of the bearing plates 22, or the distance between the vertical ribs 20 and 21 in each housing, and thus the movement of the spring ends in their supporting housings is restricted to movement longitudinally of the springs.

A bottom, downwardly-bowed leaf spring 24, which is connected with the two upper leaf springs 14 and 15 by a pair of clamping bolts 25 and 26, completes the spring assembly. The ends of the bottom spring 24 engage the underside of the bearing plates 22 in the housings 16 and 17 and are substantially in registration with the ends of the upper springs. The clamping bolts 25 and 26 thus hold the three leaf springs in place with the ends of the springs retained in housings 16 and 17 at all times.

The rear portion of the cab 11 is supported on the mounting assembly formed by the leaf springs and is secured to such assembly by means of the two clamping bolts 25 and 26. The upper ends of these bolts extend through a floor member of the cab, indicated in part by the reference 27. Preferably a cushion pad 28 of rubber, or other suitable material, is placed between the floor member 27 of the cab and the topmost spring 15 of the assembly. The clamping bolts 25 and 26 are threaded preferably at both ends and carry adjustable nuts together with suitable nut locking means.

It will be apparent from Fig. 2 that, with the clamping of the upper springs 14 and 15 (and the bottom of the cab) to the lower spring 24 by means of the clamping bolts 25 and 26 in the arrangement shown, the lower spring 24 will act as a shock absorber in preventing excessive rebounds by the upper springs, and the cab portion which the upper springs support, when shocks are transmitted from the vehicle frame through the spring assembly to the cab body. It will also be apparent that the springs can be tensioned and their flexibility reduced by tightening the clamping bolts so as to pull the upper leaf springs and the lower spring closer together. Thus, in this way, this spring assembly can be quickly and easily adjusted and the changed tension of the springs made to compensate, to considerable extent, for a load change or for different operating conditions.

In the embodiment of the invention as illustrated, a pair of upper leaf springs are shown combined with a single leaf spring, since the upper springs are the ones which carry the load while the lower spring serves the purpose of retarding excessive movement on the part of the upper springs and also enables the spring tensions in the assembly to be adjusted through the medium of the clamping bolts. Also in the spring assembly illustrated the three leaf springs are shown as being all the same size. However, various modifications could be made in the assembly and in the number and relative size of the individual leaf springs employed in carrying out this invention without departure from the principle or scope of the invention.

I claim:

1. In a motor vehicle having a cab and a cab-supporting frame with a pair of longitudinally-extending, transversely-spaced, main frame members, means for connecting the rear portion of said cab to said frame for controlled relative movement therebetween, said means consisting of a pair of substantially identical, transversely-extending, upwardly-bowed leaf springs placed one inside the other so as to coincide throughout their entire extent, a pair of support housings for the ends of said springs mounted on said main frame members respectively, a spring-supporting bearing plate in each of said housings, said spring ends slidable longitudinally to a limited extent on said plates, a third lower downwardly-bowed leaf spring similar to said first mentioned springs and of substantially the same length as said first mentioned leaf springs positioned below and in the same vertical plane with said first mentioned springs, the ends of said lower spring bearing against the under sides of said plates, a plurality of adjustable clamping bolts connecting the oppositely bowed portions of said first mentioned springs and said lower spring and exerting a constant force tending to pull said first mentioned springs and said lower spring closer together, the rear portion of said cab held on said first mentioned springs by said clamping bolts, and a pad of resilient material between said cab and said first mentioned springs, whereby said lower spring will act to restrict the vibrations of said first mentioned spring and whereby the tension of all of said springs can be adjusted through said clamping bolts.

2. In a vehicle having a main frame and a body supported on said frame, means for connecting said body to said frame, said means including a transversely-extending, upwardly-bowed leaf spring, a pair of stationary housings for the ends of said spring mounted on opposite sides of said main frame respectively, a spring-supporting bearing plate in each housing, said spring ends slidable longitudinally to a limited extent on said plates, said body mounted on said spring, a downwardly-bowed leaf spring located below said first mentioned spring and in the same vertical plane with said first mentioned spring, the ends of said downwardly-bowed leaf spring located in said housings respectively and similarly bearing against the undersides of said bearing plates, and clamping means connecting the oppositely-bowed portions of said springs and exerting a constant force tending to pull said springs closer together, whereby said downwardly-bowed spring will act to restrict the vibration of said upper spring and therewith of said body.

References Cited in the file of this patent

UNITED STATES PATENTS

| 2,349,839 | Apicella | May 30, 1944 |
| 2,754,146 | Feil | July 10, 1956 |

FOREIGN PATENTS

| 3,527 of 1873 | Great Britain | Oct. 30, 1873 |